(12) United States Patent
Chiticariu et al.

(10) Patent No.: US 11,636,099 B2
(45) Date of Patent: Apr. 25, 2023

(54) DOMAIN-SPECIFIC LABELED QUESTION GENERATION FOR TRAINING SYNTACTIC PARSERS

(71) Applicant: International Business Machines Corporation, Armonk, NY (US)

(72) Inventors: Laura Chiticariu, San Jose, CA (US); Aparna Garimella, Ann Arbor, MI (US); Yunyao Li, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 669 days.

(21) Appl. No.: 16/549,052

(22) Filed: Aug. 23, 2019

(65) Prior Publication Data

US 2021/0056101 A1 Feb. 25, 2021

(51) Int. Cl.
*G06F 16/242* (2019.01)
*G06N 20/00* (2019.01)
*G06F 40/211* (2020.01)

(52) U.S. Cl.
CPC ........ *G06F 16/2423* (2019.01); *G06F 16/243* (2019.01); *G06F 40/211* (2020.01); *G06N 20/00* (2019.01)

(58) Field of Classification Search
CPC .. G06F 16/2423; G06F 16/243; G06F 40/211; G06N 20/00
See application file for complete search history.

(56) References Cited

U.S. PATENT DOCUMENTS

| | | | |
|---|---|---|---|
| 7,877,343 B2 | 1/2011 | Cafarella et al. | |
| 8,706,491 B2* | 4/2014 | Chelba | G06F 40/205 |
| | | | 704/231 |
| 8,938,410 B2 | 1/2015 | Cafarella et al. | |
| 9,471,559 B2* | 10/2016 | Castelli | G06F 16/353 |
| 9,684,876 B2 | 6/2017 | Agarwalla et al. | |
| 9,690,774 B1 | 6/2017 | Beason et al. | |
| 2019/0340172 A1* | 11/2019 | McElvain | G06N 20/20 |

OTHER PUBLICATIONS

Anonymous; "A System and a Method for Unsupervised Sentence Boundary Detection Using Syntactic Parsers"; An IP.com Prior Art Database Technical Disclosure—IP.com No. IPCOM000203888D; Feb. 8, 2011; 5 pages.
Anonymous; "Automatic, In-Domain, Question/Answer-Set Generation"; An IP.com Prior Art Database Technical Disclosure—IP.com No. IPCOM000245124D; Feb. 10, 2016; 5 pages.

(Continued)

*Primary Examiner* — Mark D Featherstone
*Assistant Examiner* — Ranjit P Doraiswamy
(74) *Attorney, Agent, or Firm* — Cantor Colburn LLP; Joseph P. Curcuru

(57) ABSTRACT

A computer-implemented method for generating a question from an abstracted template is described. A non-limiting example of the computer-implemented method includes receiving, by a processor, a question. The method parses, by the processor, the question into a parse tree and abstracts, by the processor, an abstracted template from the parse tree. The method receives, by the processor, a domain schema and a domain knowledge base and generates, by the processor, a new question based on the abstracted template, the domain schema, and the domain knowledge base.

8 Claims, 17 Drawing Sheets

(56) References Cited

OTHER PUBLICATIONS

Anonymous; "Dependency parsing for question normalization"; An IP.com Prior Art Database Technical Disclosure—IP.com No. IPCOM000244155D; Nov. 16, 2015; 4 pages.
Danon et al.; "A Syntactic Approach to Domain-Specific Automatic Question Generation"; arXiv:1712.09827v1 [cs.CL]; Dec. 28, 2017; 10 pages.
De Marneffe et al.; "Stanford typed dependencies manual"; Stanford Parser v. 3.7.0; Sep. 2016; 28 pages.
Hara et al.; "Exploring Difficulties in Parsing Imperatives and Questions"; Proceedings of the 5th International Joint Conference on Natural Language Processing; Nov. 8-13, 2011; 9 pages.
Mell et al.; "The NIST Definition of Cloud Computing—Recommendations of the National Institute of Standards and Technology"; U.S. Department of Commerce; Sep. 2011; 7 pages.
Soleymanzadeh; "Domain Specific Automatic Question Generation from Text"; Proceedings of the 55th Annual Meeting of the Association for Computational Linguistics—Student Research Workshop; Jul. 30-Aug. 4, 2017; 7 pages.

* cited by examiner

What was the monetary value of Nobel Peace Prize in 1989

What was <nsubj> of Nobel Peace Prize in 1989

DOMAIN-SPECIFIC LABELED QUESTION GENERATION FOR TRAINING SYNTACTIC PARSERS

BACKGROUND

The present invention generally relates to parsing, and more specifically, to domain-specific labeled question generation for training syntactic parsers.

Understanding natural language questions is the first step in building accurate and reliable natural language interfaces ranging from question answering to conversational agents. Recent work on various search engines focuses on building domain-specific conversational agents: agents that understand a small set of domains very well. Examples include general-interest domains such as weather and travel and specialized domains such as finance and genomics.

SUMMARY

Embodiments of the present invention are directed to a computer-implemented method for generating a question from an abstracted template. A non-limiting example of the computer-implemented method includes receiving, by a processor, a question. The method parses, by the processor, the question into a parse tree and abstracts, by the processor, an abstracted template from the parse tree. The method receives, by the processor, a domain schema and a domain knowledge base and generates, by the processor, a new question based on the abstracted template, the domain schema, and the domain knowledge base.

Embodiments of the present invention are directed to a system for generating a question from an abstracted template. A non-limiting example of the system includes a processor and a memory communicatively coupled to the processor. The memory has stored therein instructions that when executed cause the processor to receive a question. The instructions cause the processor to parse the question into a parse tree and abstract by an abstracted template from the parse tree. The instructions cause the processor to receive a domain schema and a domain knowledge base and generate, by the processor, a new question based on the abstracted template, the domain schema, and the domain knowledge base.

Embodiments of the invention are directed to a computer program product for generating a question from an abstracted template, the computer program product comprising a computer readable storage medium having program instructions embodied therewith. The program instructions are executable by a processor to cause the processor to perform a method. A non-limiting example of the method includes causing the processor to receive a question. The method causes the processor to parse the question into a parse tree and abstract an abstracted template from the parse tree. The method causes the processor to receive a domain schema and a domain knowledge base and generates, by the processor, a new question based on the abstracted template, the domain schema, and the domain knowledge base.

Embodiments of the invention are directed to a computer-implemented method for generating a training dataset for syntactic parsing of domain-specific questions. The method includes, receiving, by a processor, seed-labeled questions from a domain, the questions being labeled with syntactic dependencies. The method receives, by the processor, domain knowledge that includes: a domain schema modeling concepts and relationships of interest in the domain; a set of schema annotations provided by a domain expert; and a knowledge base of data instances for the domain schema. For each seed-labeled question, constructing, by the processor, a first question template that maintains a general structure of the question, but abstracts away details of specific entities in the question leaving gaps. The method generates, by the processor, a dataset of new questions by filling in the gaps in the first question template with new entities, the new entities being obtained by leveraging the domain schema, the set of schema annotations, and the knowledge base, wherein the new questions are labeled with syntactic dependencies. The method trains, by the processor, a syntactic parser using the dataset of new questions.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
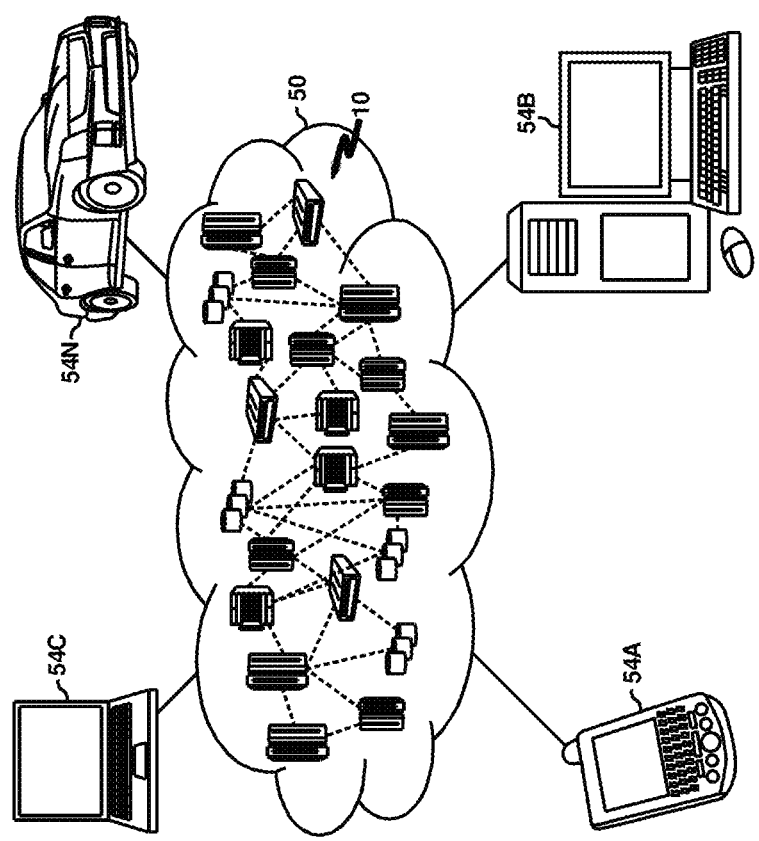
FIG. 1 depicts a cloud computing environment according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
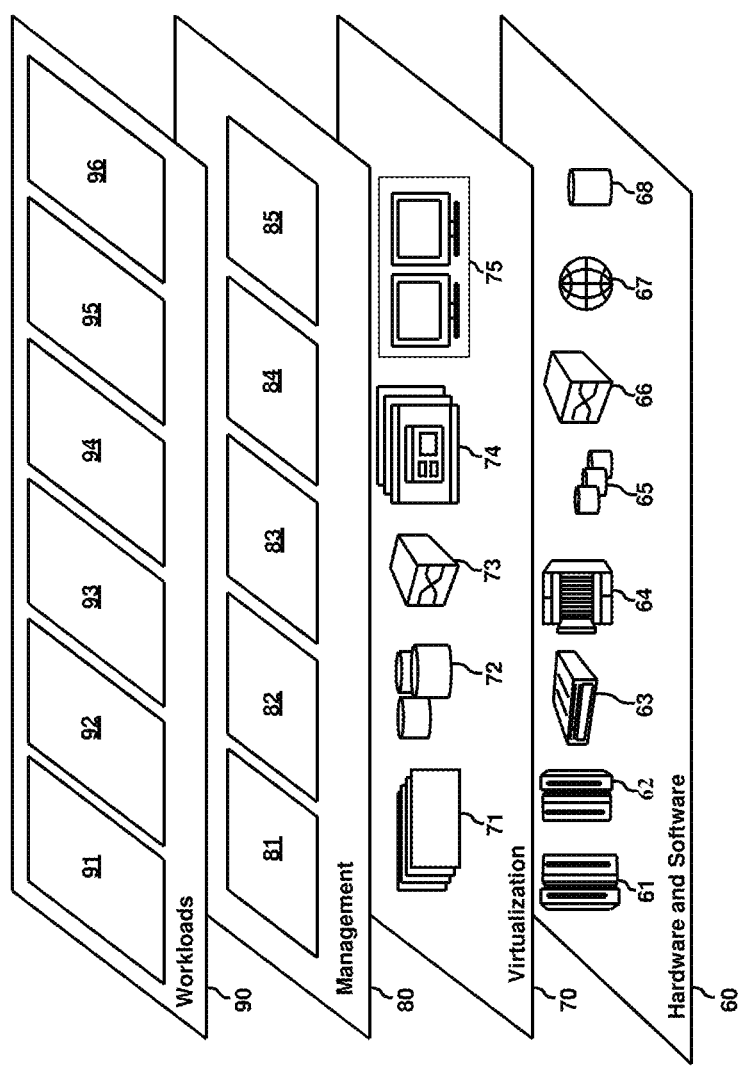
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are consumed within the cloud computing environment, and they also provide billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94 template abstraction processing 95; and template question generation processing 96.

Figure 3:
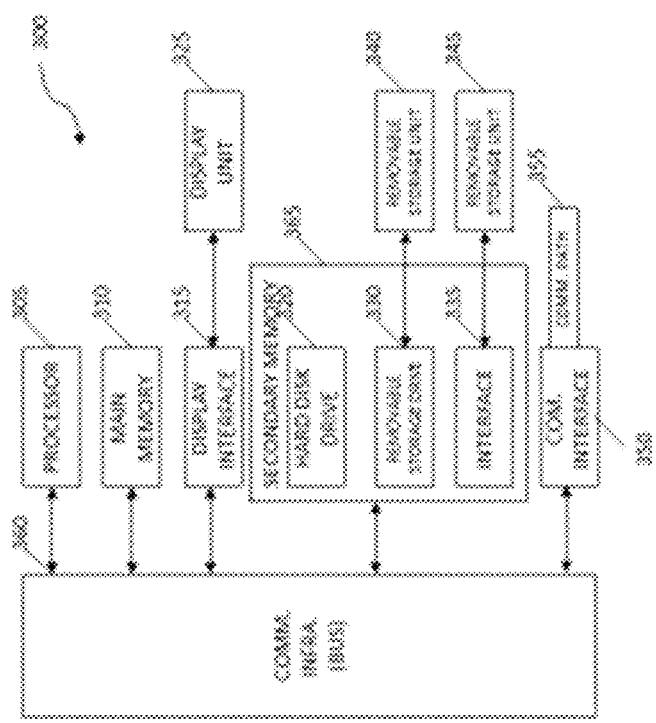
FIG. 3 depicts a high-level block diagram computer system, which can be used to implement one or more aspects of the present invention.

FIG. 3 depicts a high-level block diagram computer system 300, which can be used to implement one or more aspects of the present invention. More specifically, computer system 300 can be used to implement some hardware components of embodiments of the present invention. Although one exemplary computer system 300 is shown, computer system 300 includes a communication path 355, which connects computer system 300 to additional systems (not depicted) and can include one or more wide area networks (WANs) and/or local area networks (LANs) such as the Internet, intranet(s), and/or wireless communication network(s). Computer system 300 and additional system resources are in communication via communication path 355, e.g., to communicate data between them.

Computer system 300 includes one or more processors, such as processor 305. Processor 305 is connected to a communication infrastructure 360 (e.g., a communications bus, cross-over bar, or network). Computer system 300 can include a display interface 315 that forwards graphics, text, and other data from communication infrastructure 360 (or from a frame buffer not shown) for display on a display unit 325. Computer system 300 also includes a main memory 310, preferably random access memory (RAM), and can also include a secondary memory 365. Secondary memory 365 can include, for example, a hard disk drive 320 and/or a removable storage drive 330, representing, for example, a floppy disk drive, a magnetic tape drive, or an optical disk drive. Removable storage drive 330 reads from and/or writes to a removable storage unit 340 in a manner well known to those having ordinary skill in the art. Removable storage unit 340 represents, for example, a floppy disk, a compact disc, a magnetic tape, or an optical disk, etc. which is read by and written to by removable storage drive 330. As will be appreciated, removable storage unit 340 includes a computer readable medium having stored therein computer software and/or data.

In alternative embodiments, secondary memory 365 can include other similar means for allowing computer programs or other instructions to be loaded into the computer system. Such means can include, for example, a removable storage unit 345 and an interface 335. Examples of such means can include a program package and package interface (such as that found in video game devices), a removable memory chip (such as an EPROM, or PROM) and associated socket, and other removable storage units 345 and interfaces 335 which allow software and data to be transferred from the removable storage unit 345 to computer system 300.

Computer system 300 can also include a communications interface 350. Communications interface 350 allows software and data to be transferred between the computer system and external devices. Examples of communications interface 350 can include a modem, a network interface (such as an Ethernet card), a communications port, or a PCM-CIA slot and card, etcetera. Software and data transferred via communications interface 350 are in the form of signals which can be, for example, electronic, electromagnetic, optical, or other signals capable of being received by communications interface 350. These signals are provided to communications interface 350 via communication path (i.e., channel) 355. Communication path 355 carries signals and can be implemented using wire or cable, fiber optics, a phone line, a cellular phone link, an RF link, and/or other communications channels.

In the present description, the terms "computer program medium," "computer usable medium," and "computer readable medium" are used to generally refer to media such as main memory 310 and secondary memory 365, removable storage drive 330, and a hard disk installed in hard disk drive 320. Computer programs (also called computer control logic) are stored in main memory 310 and/or secondary memory 365. Computer programs can also be received via communications interface 350. Such computer programs, when run, enable the computer system to perform the features of the present invention as discussed herein. In particular, the computer programs, when run, enable processor 305 to perform the features of the computer system. Accordingly, such computer programs represent controllers of the computer system.

Turning now to an overview of technologies that are more specifically relevant to aspects of the invention, understanding natural language questions is the first step in building accurate and reliable natural language interfaces ranging from question answering to conversational agents. Recent work on various search engines focuses on building domain-specific conversational agents: agents that understand a small set of domains very well. Examples include general-interest domains such as weather and travel and specialized domains such as finance and genomics.

The accuracy of syntactic parsers is known to depend significantly on the stylistic and syntactic similarities between their training data and application text. However, questions are often underrepresented in classic training corpora. In Penn TreeBank, only 0.5% of sentences from the Wall Street Journal are complete questions; furthermore, the majority are rhetorical in nature, while types of questions naturally occurring in conversations (e.g., starting with interrogatives wh-/how, imperatives show me, name, or yes/no questions) are heavily underrepresented.

Recognizing this problem, Question-Bank, a labeled corpus of 4,000 questions was introduced. However, it remains unlikely for questions pertaining to specific domains to be sufficiently represented in a general purpose question corpus, leading to poor parsing performance on domain-specific questions. For example, for "Show me Bill Gates' insider transactions since 2011," a state-of-the-art parser trained on all data within the Universal Dependencies English TreeBank and Question-Bank attaches "since" to "show" instead of "transactions." This causes the system to miss the full intent behind the question, which asks for Bill Gates' insider transactions since 2011, and not all his transactions. As another example, in "Will it rain tomorrow by noon?." "tomorrow" is attached to "rain" with a wrong dependency relation (dobj instead of nmod:tmod), causing the system to miss the temporal aspect.

Turning now to an overview of the aspects of the invention, one or more embodiments of the invention address the above-described shortcomings of the prior art by providing a natural solution to obtain highly accurate domain-specific parsers in order to create a training corpus of questions for that domain.

The above-described aspects of the invention address the shortcomings of the prior art by providing a method to minimize the effort required to get started with a new domain by leveraging a different kind of domain knowledge: (1) a domain schema modeling the concepts and relationships of interest in the domain, and (2) a knowledge base of data instances that populate the domain schema. The method provides a framework for generating a large training corpus for syntactic parsing of domain-specific questions from a small number of seed domain questions. The method quantifies various types of domain knowledge and systematically leverages it to autogenerate labeled questions for the domain. The method is applied to two domains: a general-interest one, e.g., weather, and a specialized one, e.g., finance.

Figure 4:
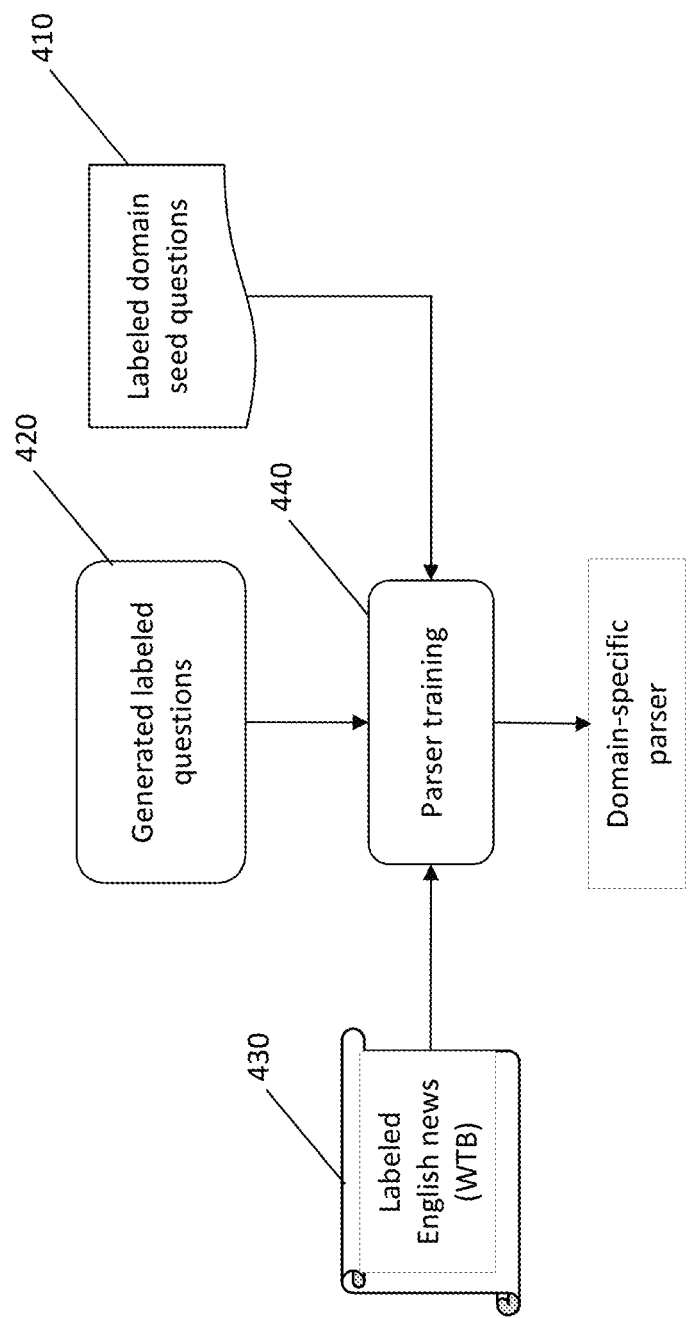
FIG. 4 depicts a high-level flow chart of parser generation according to embodiments of the invention.

Turning now to a more detailed description of aspects of the present invention, FIG. 4 depicts a high-level flow chart of parser generation according to embodiments of the invention. The following discussion of the method is with respect to the method running on the computer depicted in FIG. 3, although it also applies to the cloud computing system of FIGS. 1 and 2. The method generates, by processor 305, a large training corpus by combining a few seed questions 410 from the domain (as little as 10), labeled with syntactic dependencies, and domain knowledge 430. For each seed labeled question, the method, by processor 305, first constructs a question template that maintains the general structure of the question, but abstracts away details of specific entities. The method generates, by processor 305, new questions 420 by filling the gaps in the template with new entities, obtained by leveraging the domain schema and knowledge base. A domain expert can systematically annotate a domain schema with a small number of annotations to ensure naturalness of generated questions. Thus, the method effectively utilizes domain expertise available in closed domains to make up for lack of training data and the effort required in creating it manually. Each of these is fed, by processor 305, to a parcer for training 440 yielding a domain specific parser.

Figure 5A:
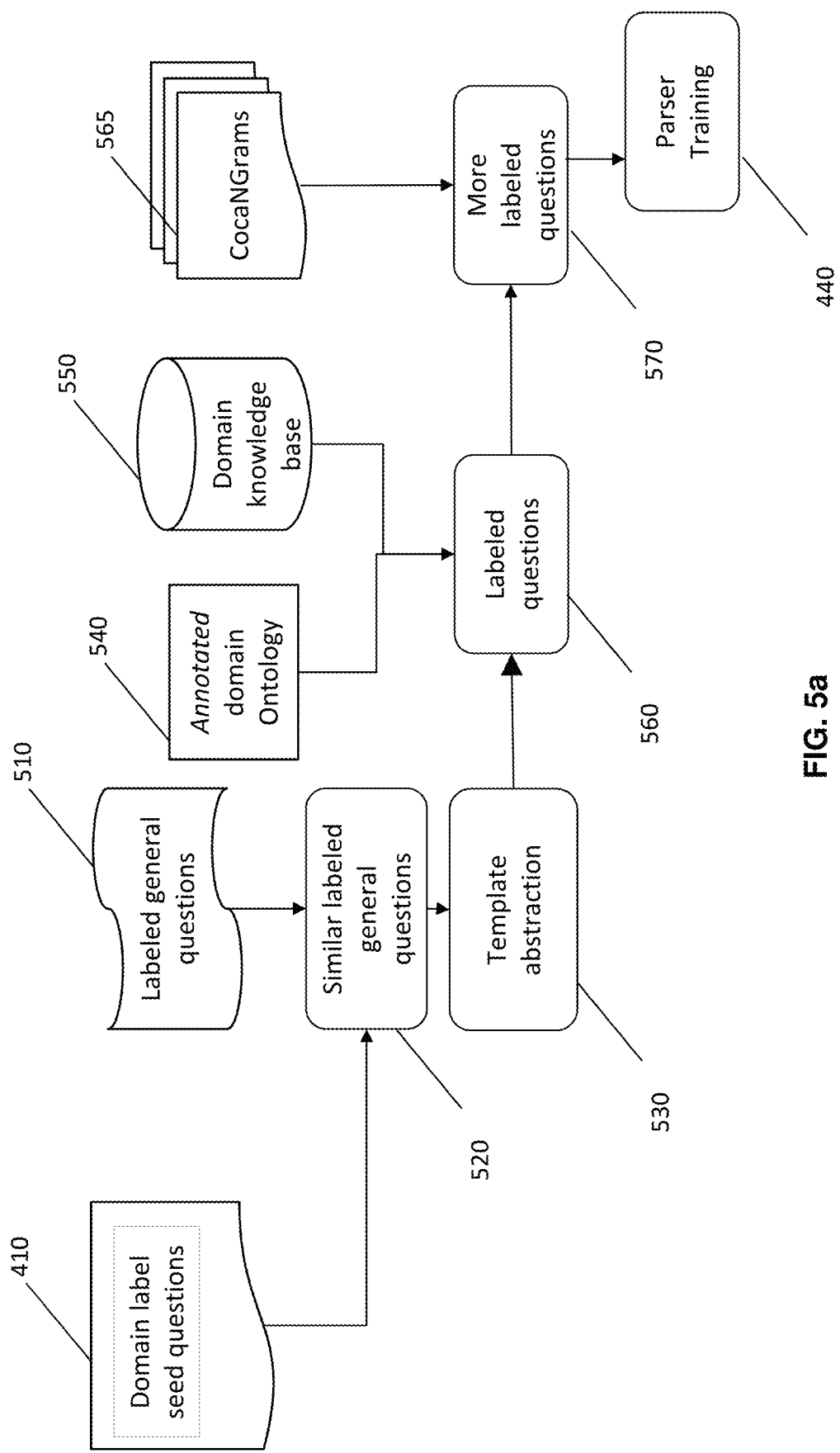
FIG. 5a depicts a flow chart of parser generation according to embodiments of the invention.

FIG. 5a depicts a flow chart of parser generation according to embodiments of the invention. The method takes as input a small set of seed questions 410 labeled with syntactic dependencies, a domain schema 540, and a knowledge base 550 that conforms to the schema. Labeled general questions 510 combine with seed questions 410 to provide, by processor 305, similar labeled general questions 520. The seed questions 410 may also be used to train a black box generation model. The method uses the Universal Dependencies v1.4 annotation guideline for syntactic parse trees. For each similar labeled question 520, the method constructs, by processor 305, a template 530 that maintains the general structure of the question, but abstracts away details about the specific entities. New questions are generated, by processor 305, by filling the gaps in the question template with new entities drawn based on domain schema 540 and knowledge base 530. These are combined, by processor 305, to yield labeled questions 560. CocaNGrams 565 (n-grams from the Corpus of Contemporary American English, containing over 520 million words from magazines, fiction, and academic tests) are combined, by processor 305, with the labeled questions 560 to produce more labeled questions 570, which are then used for parser training 440 to generated a domain specific parser.

Figure 6:
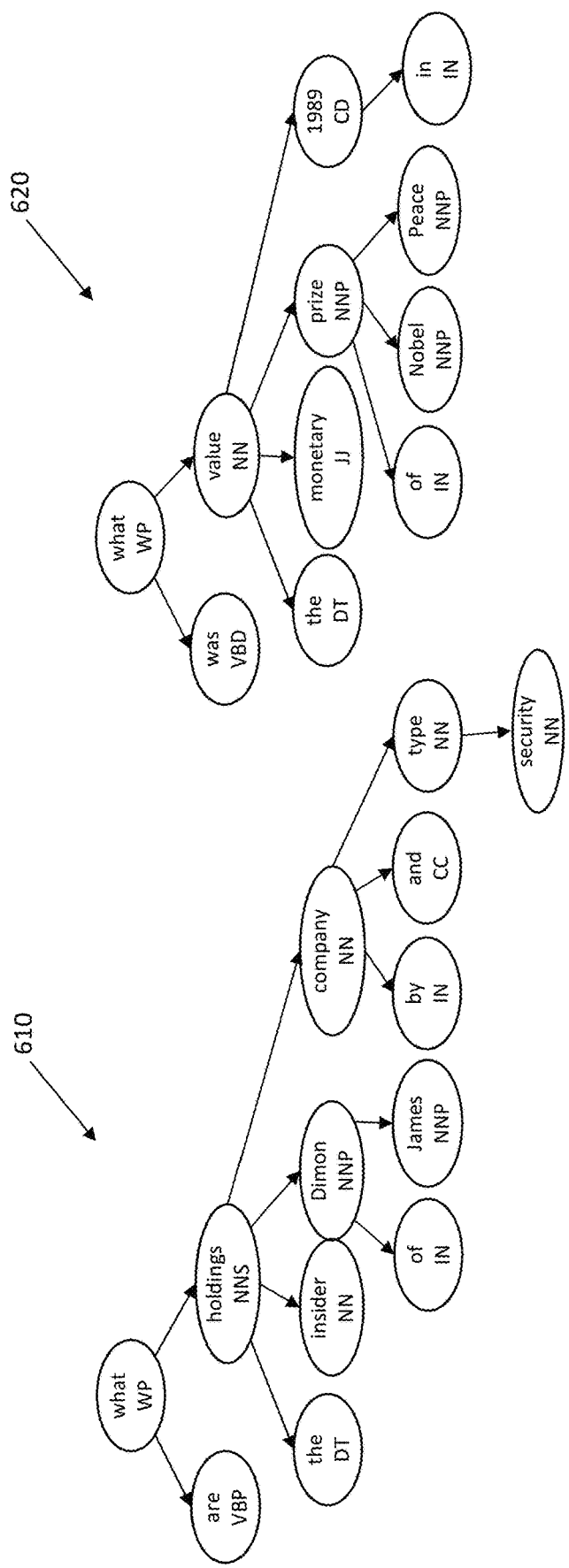
FIG. 6 depicts two syntactic parse trees generated according to embodiments of the invention.

Given labeled domain seed questions, the first stage involves abstracting the structures, or templates, from the seed questions. Templates are constructed around question entities, defined as follows: Given question Q, a question entity QENT is any constituent C in the syntactic parse tree of Q such that C's head word is a content word (noun, verb, adjective, or adverb). An example domain specific parse tree 610 is illustrated in FIG. 6. The question shown in domain specific parse tree 610 has several entities.

The method focuses on three types of interesting entities, based on the type of dependency relation to their parent in a parse tree of the question as follows. Subject Entity (qsubj) represents the subject of a question. Its position in the parse tree depends on the question type. For wh-interrogatives, the query subject usually occurs as the nominal subject (nsubj) of the root (QENT1 in FIG. 2a). For imperatives (starting with show, tell, etc.), the query subject usually occurs as the direct object (dobj) of the imperative verb (QENT1 in FIG. 2b). These two qsubj identification strategies cover the majority of questions that were encountered. The method uses additional strategies to cover additional types of questions that those of ordinary skill in the art after reading this disclosure would understand. Modifier Entity (qmod) is any (noun) node that modifies a QENT. In the parse tree, they usually relate to the head word of the QENT via an nmod dependency1. In FIG. 6, 'James Dimon' and 'company' are qmod entities of 'insider holdings'. Temporal Entity (qtmp) captures temporal information, such as dates or years. In FIG. 6, '2014' is a qtmp entity. The method uses a semantic role labeler to identify qtmp. The method defines question template as follows: Given question Q, the template of Q is TQ where all of its query entities qsubj, qmod and qtmp have been replaced by placeholders.

Figure 5B:
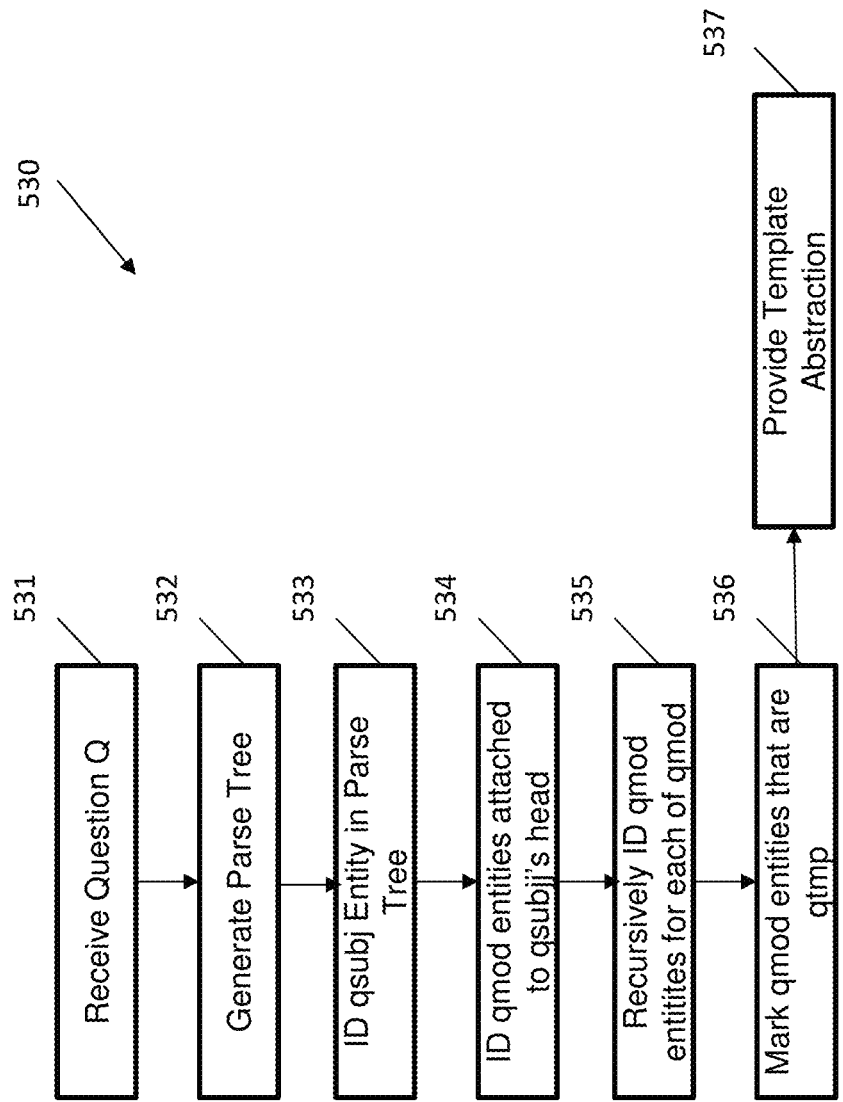
FIG. 5b depicts a flow chart for template abstraction according to embodiments of the invention.

FIG. 5b depicts a flow chart for template abstraction according to embodiments of the invention. A question is received by processor 305 (Stage 531). A parse tree is generated, by processor 305, from the received question (Stage 532). The terms in the parse tree are from the Stanford Typed Dependencies Manual by Marie-Catherine de Marneffe and Christopher D. Manning, version 3.7.0 from September 2016. It can be found at the website given by the concatenation of "https://nlp.stanford." and "edu/software/dependencies_manual.pdf". For example, the term "what" is labeled "WP" which means it is a wh-pronoun in part-of-speech tagging in a parse tree. Those of ordinary skill in the art will understand the functioning of parse trees and part-of-speech tagging.

Figure 14:
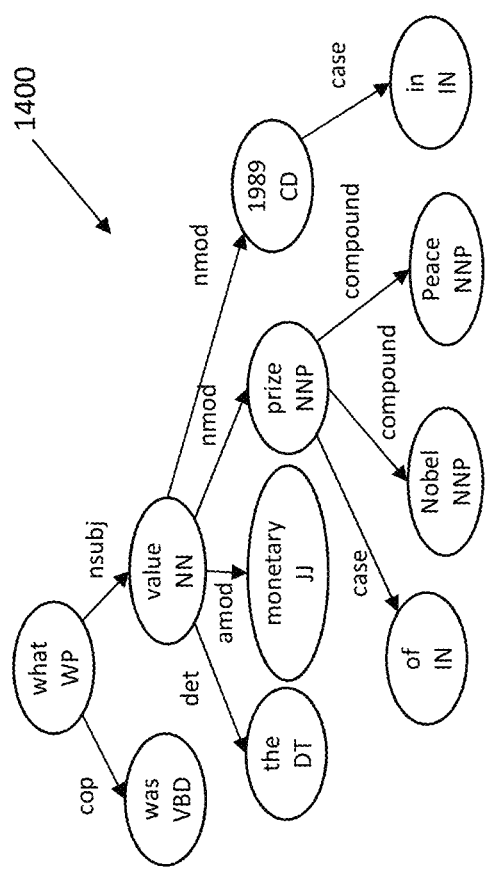
FIGS. 14-16 illustrates an example of template abstraction for a parse tree according to embodiments of the invention.
Figure 15:
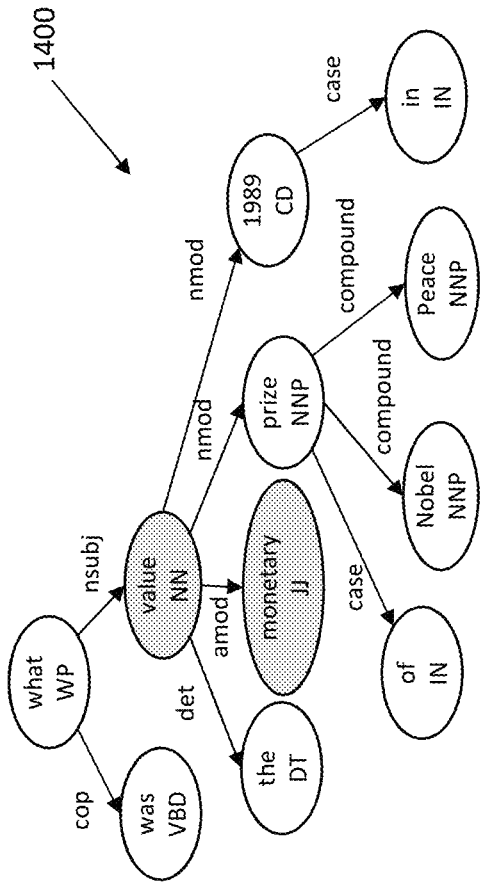
Figure 16:
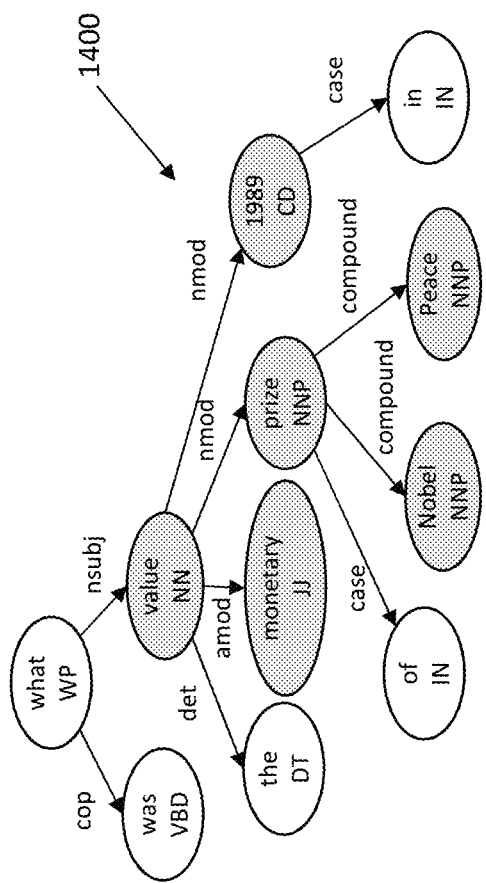

Identification is made by processor 305 of the qsubj entity in the parse tree generated in Stage 532 (Stage 533). All qmod entities attached to qsubj's head in the parse tree are identified by processor 305 (Stage 534). Recursively, qmod entities are identified by processor 305 for each of qmode (Stage 535). Among all qmod entities, those that are qtmp are identified by processor 305 (Stage 536). The template abstraction is provided, by processor 305, by qsubj, qmod, and qtmp replaced by placeholders (Stage 537). FIGS. 14-16 further illustrate an example of template abstraction.

Figure 7:
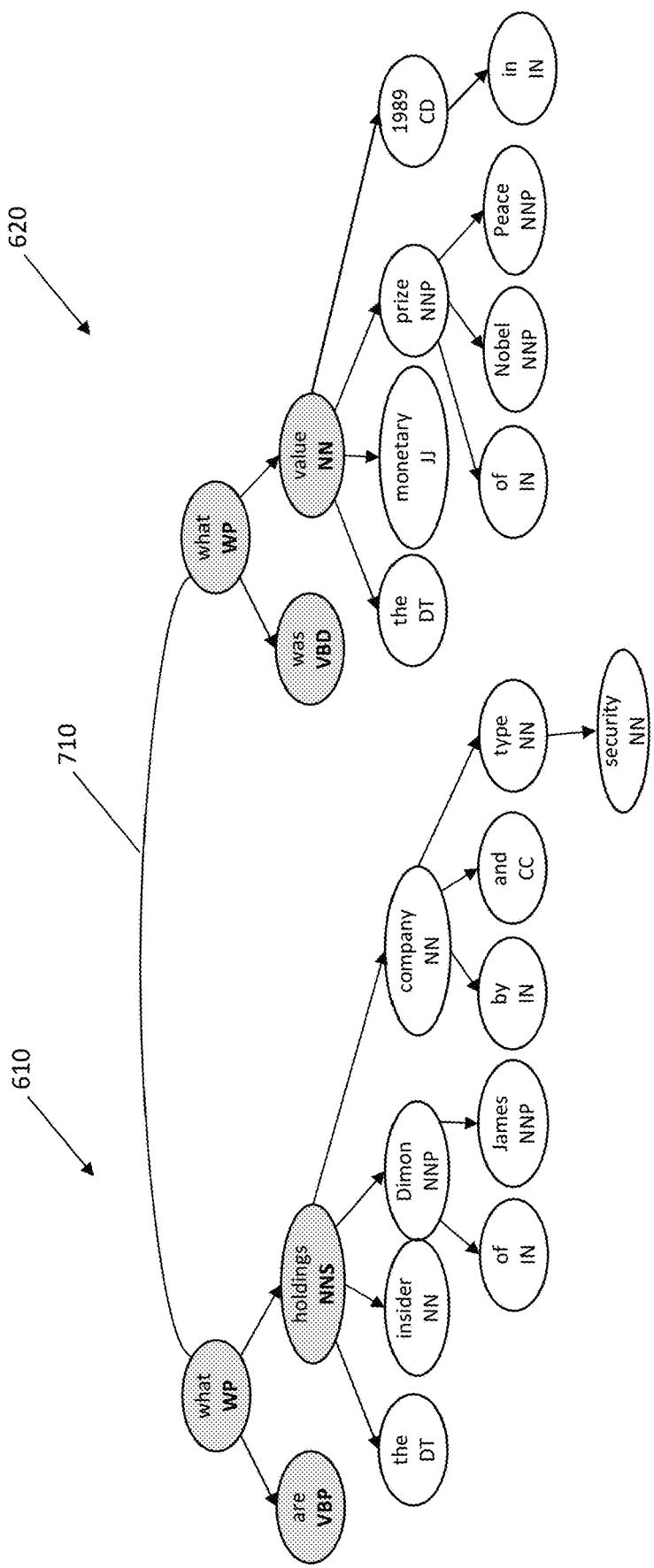
FIG. 7 depicts two syntactic parse trees generated according to embodiments of the invention.

FIG. 6 depicts two syntactic parse trees generated according to embodiments of the invention. The domain specific parse tree 610 represents a finance question and a general parse tree 620 represents a general question. An examination is performed, by processor 305, at the various depths between the two trees 610 and 620. FIG. 7 depicts two syntactic parse trees generated according to embodiments of the invention. A tree edit distance of depth one is illustrated by the highlighted nodes in domain specific parse tree 610 and general parse tree 620. A comparison is made at a first level 710 yielding a depth of 1 and a distance of 1.

Figure 8:
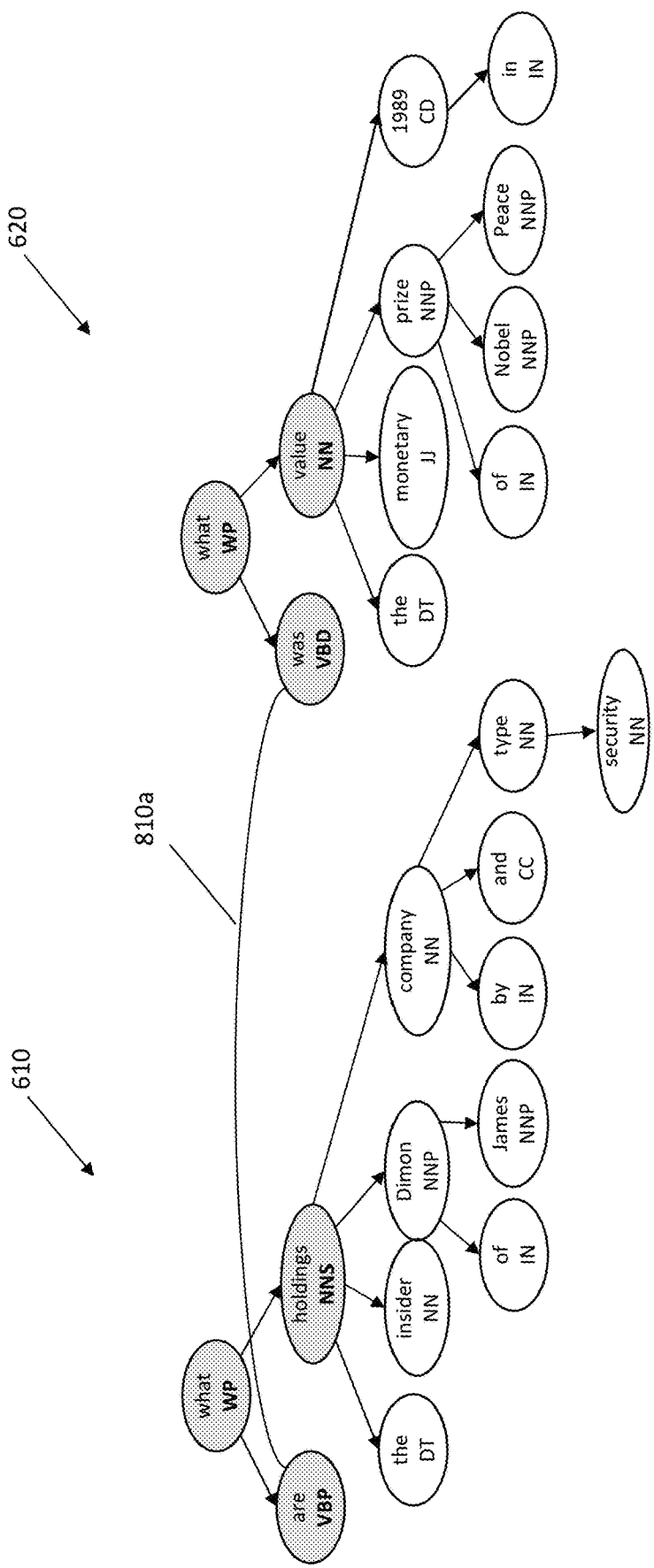
FIG. 8 depicts two syntactic parse trees generated according to embodiments of the invention.

FIG. 8 depicts two syntactic parse trees generated according to embodiments of the invention. A tree edit distance of depth two is illustrated by the highlighted nodes in domain specific parse tree 610 and general parse tree 620. A comparison is made at a second level 810a yielding a depth of 2 and a distance of 1.

Figure 9:
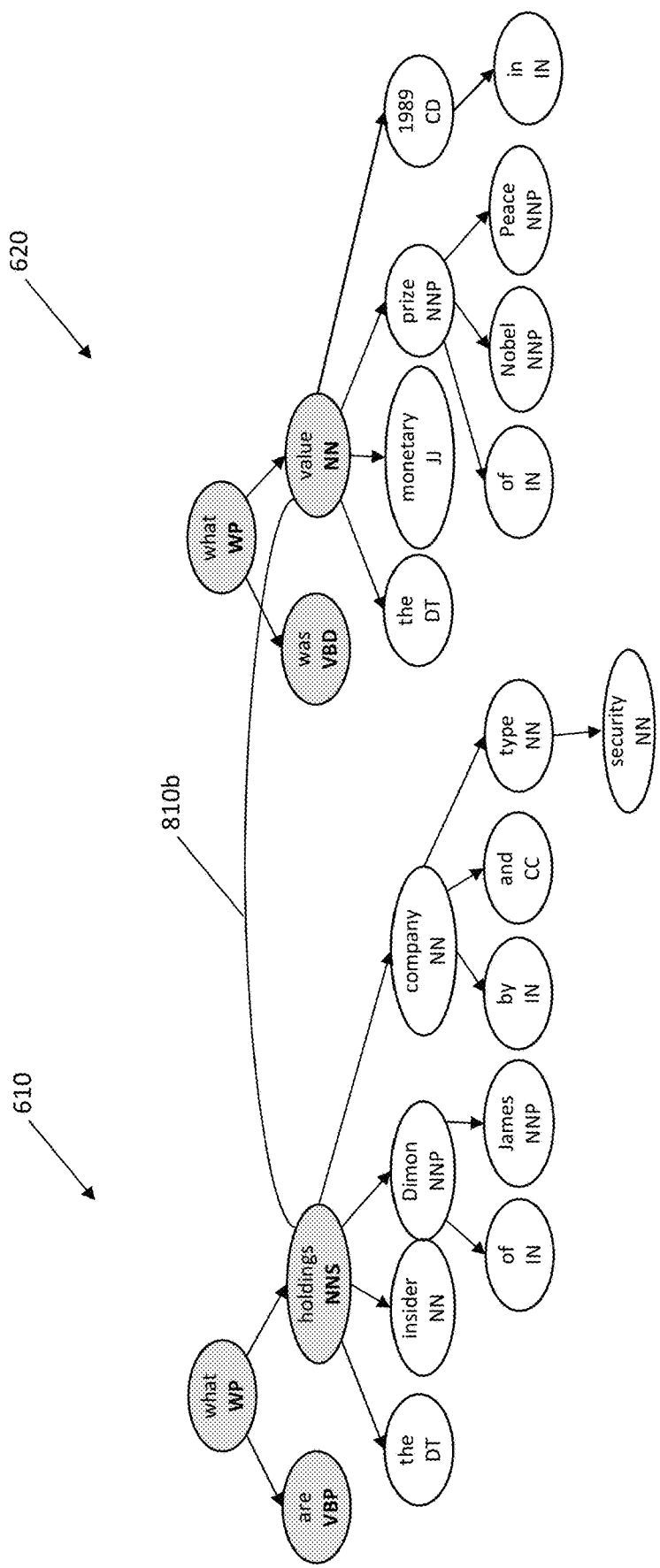
FIG. 9 depicts two syntactic parse trees generated according to embodiments of the invention.

FIG. 9 depicts two syntactic parse trees generated according to embodiments of the invention. A tree edit distance of depth two is illustrated by the highlighted nodes in domain specific parse tree 610 and general parse tree 620. A comparison is made at a second level 810b yielding a depth of 2 and a distance of 2.

Figure 10:
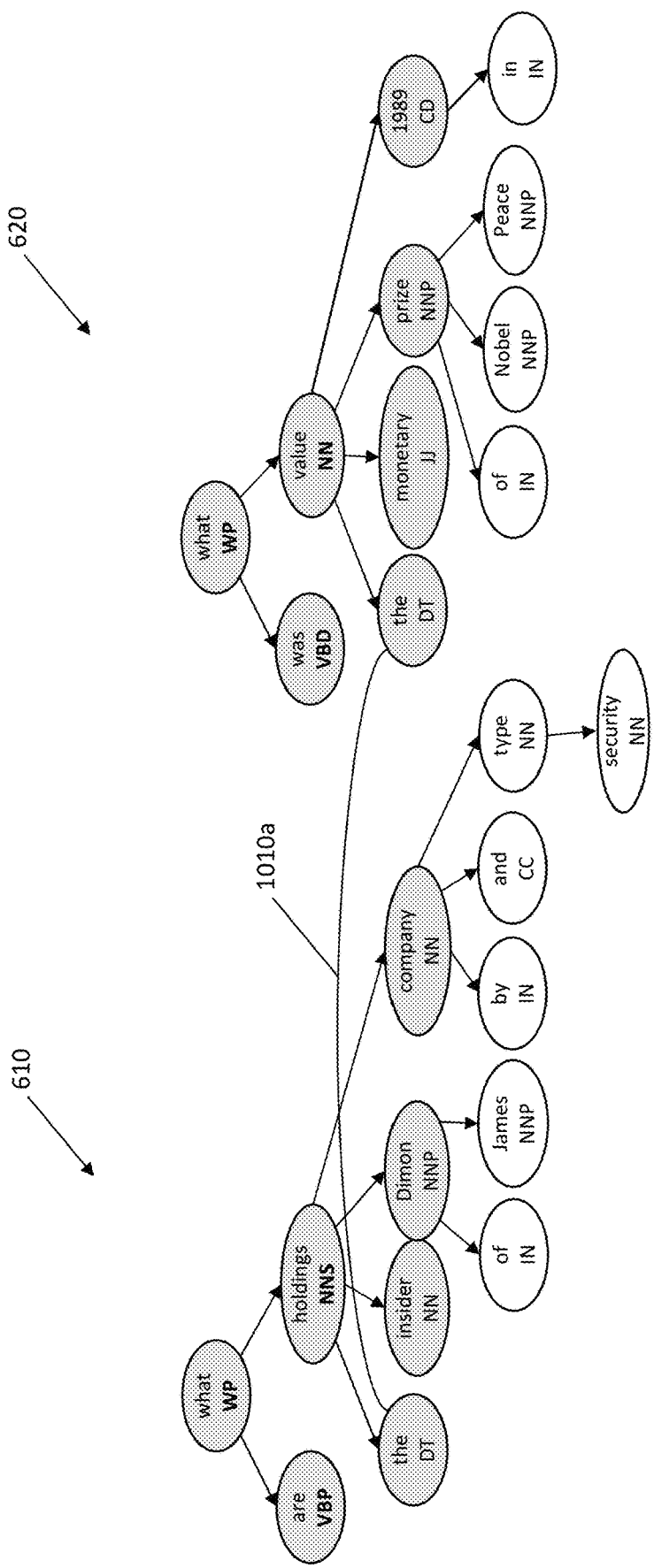
FIG. 10 depicts two syntactic parse trees generated according to embodiments of the invention.

FIG. 10 depicts two syntactic parse trees generated according to embodiments of the invention. A tree edit distance of depth two is illustrated by the highlighted nodes in domain specific parse tree 610 and general parse tree 620. A comparison is made at a third level 1010a yielding a depth of 3 and a distance of 2.

Figure 11:
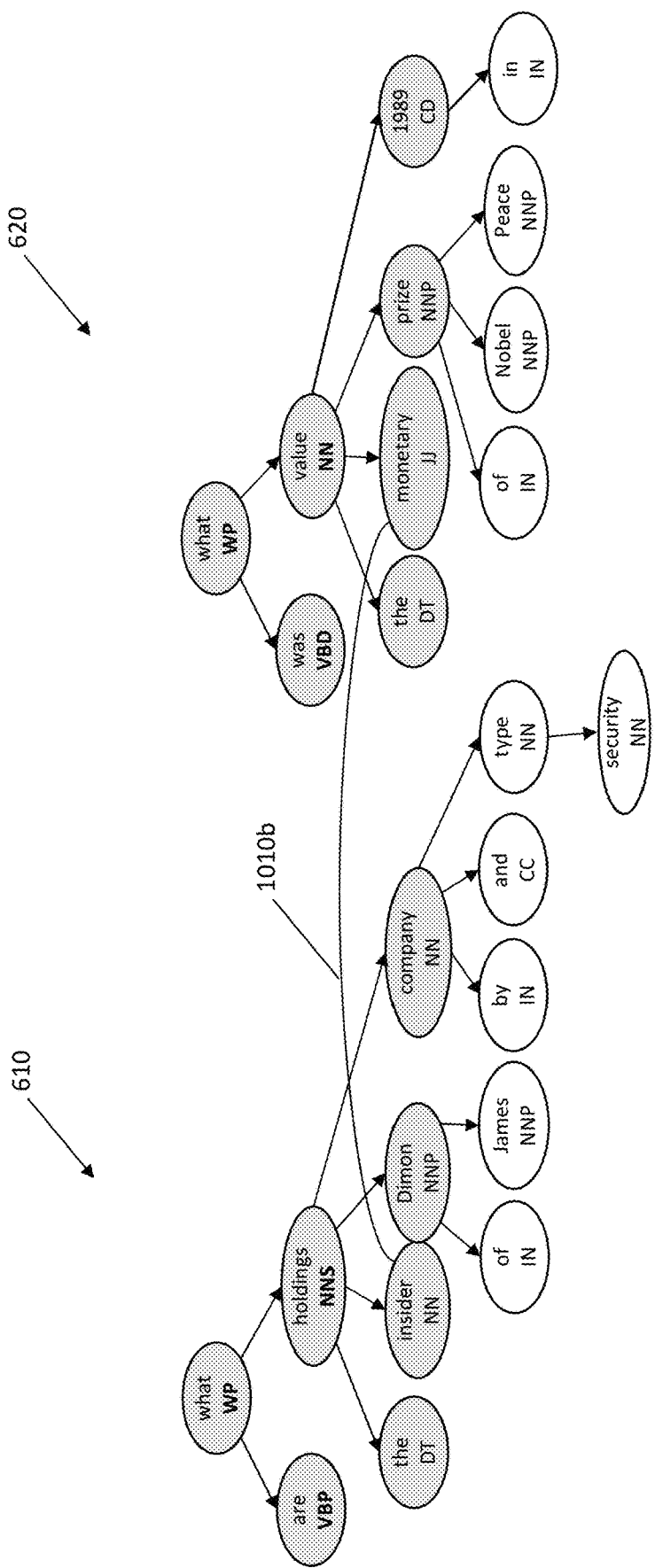
FIG. 11 depicts two syntactic parse trees generated according to embodiments of the invention.

FIG. 11 depicts two syntactic parse trees generated according to embodiments of the invention. A tree edit distance of depth two is illustrated by the highlighted nodes in domain specific parse tree 610 and general parse tree 620. A comparison is made at a third level 1010b yielding a depth of 3 and a distance of 3.

Figure 12:
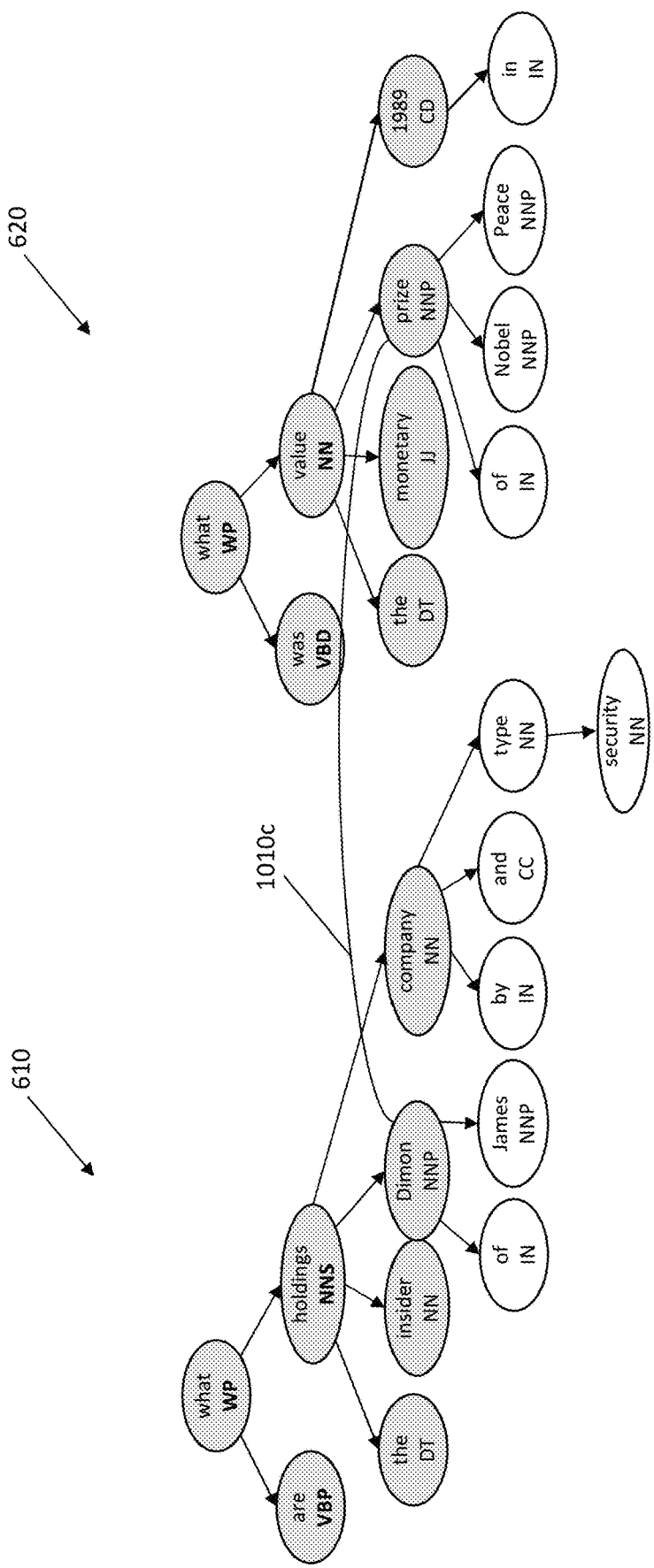
FIG. 12 depicts two syntactic parse trees generated according to embodiments of the invention.

FIG. 12 depicts two syntactic parse trees generated according to embodiments of the invention. A tree edit distance of depth two is illustrated by the highlighted nodes in domain specific parse tree 610 and general parse tree 620. A comparison is made at a third level 1010c yielding a depth of 3 and a distance of 3.

Figure 13:
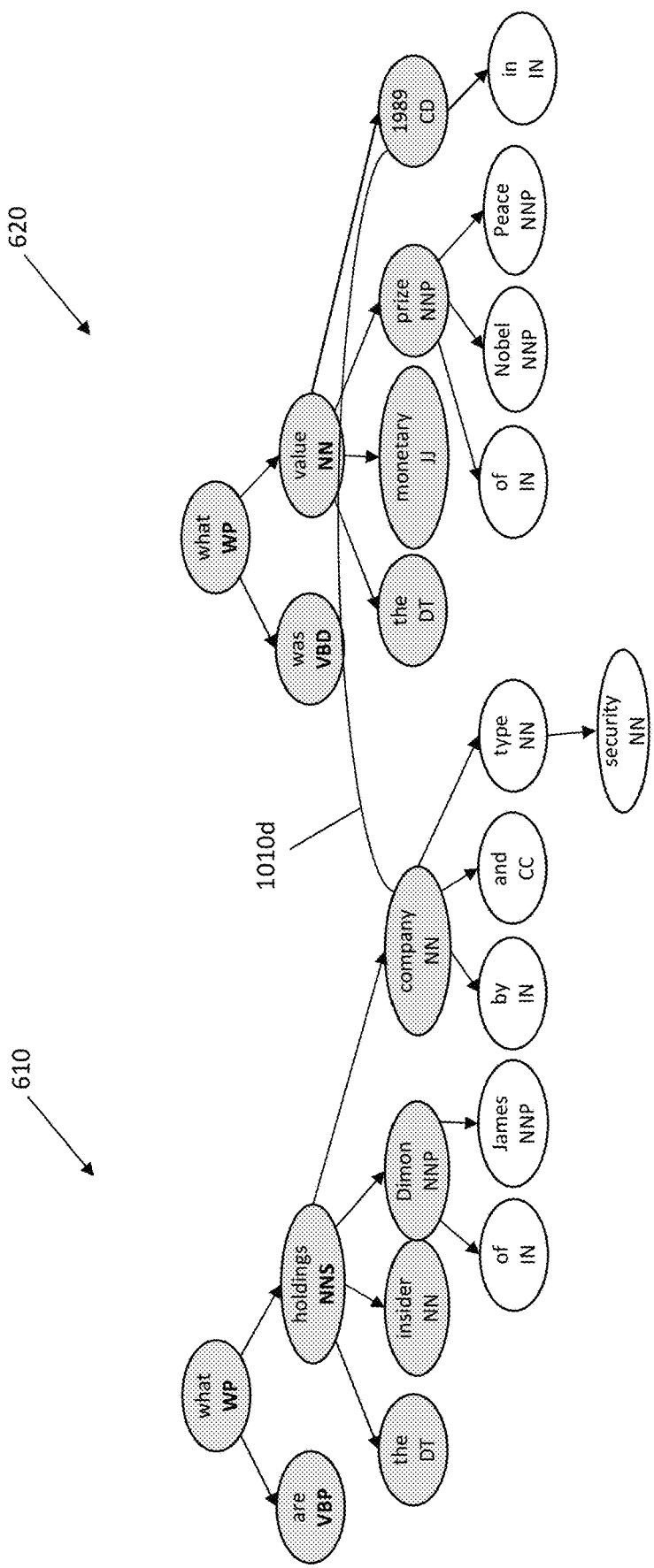
FIG. 13 depicts two syntactic parse trees generated according to embodiments of the invention.

FIG. 13 depicts two syntactic parse trees generated according to embodiments of the invention. A tree edit distance of depth two is illustrated by the highlighted nodes in domain specific parse tree 610 and general parse tree 620. A comparison is made at a third level 1010d yielding a depth of 3 and a distance of 4.

FIGS. 14-16 illustrate an example of template abstraction for a parse tree according to embodiments of the invention. FIG. 14 illustrates a parse tree 1400 for the question "What was the monetary value of Nobel Peace Prize in 1989." The template abstraction methodology 530, using processor 305, in FIG. 15, abstracts "monetary value" to <nsubj>. The template abstraction methodology 530, using processor 305, in FIG. 16 abstracts "Nobel Peace Prize" to <nmod> and abstracts "in 1989" to <TMP>.

Following template abstraction, the templates that have been abstracted need to be filled. Given a template, new questions are generated by systematically filling in entities qsubj, qmod and qtmp with new values obtained from the domain schema and knowledge base. The main challenges are: (1) Which new values are suitable for filling in entities? and (2) How to automatically construct the parse tree for a generated question?

To address the first challenge, the method uses a set of heuristics for filling different types of entities in a template. First, the method defines valued property as follows: Given class property p, a valued property Vp of p is a phrase with p as head and one of p's data instances attached as prepositional phrase, using preposition 'of' when p is of Numeric type and 'as' when p is of String type. For example, 'value of 20; 000' is a possible valued property for Holding:value.

The method employees the following replacement heuristics for each entity type. If sufficient labeled data are available, some of these heuristics can be learned from the data. Entity qsubj can be filled with either (1) a class property, or (2) an instance of a class property of type string, provided that the property is not name and the instance is not a proper noun. For example, qsubj in an abstract template can be filled with AssignmentHistory:title or AssignmentHistory:'CEO' resulting in What is the title of . . . ? and Who is the CEO of . . . ? The proper noun restriction avoids generating meaningless questions such as What is the 224-540-232 of . . . ? The restriction on name and string type avoids questions such as What is the Citigroup Inc . . . ?, and What is the 20,000 of . . . ?

Entity qmod is filled based on the QENT it modifies. If QENT is a class property, qmod is filled with an instance of a related class. In an abstracted template, when qsubj is filled with AssignmentHistory:title, the qmod1 slot can be filled with Person:name='Neil Smit,' resulting in What are the titles of Neil Smit . . . ?

If QENT is a class instance, it is changed to the name of the class, and qmod is filled with a Vp of property p of a related class. For example, in an abstracted template, if qmod1 is filled with Company:name='Citigroup Inc', it will be changed to 'company', and qmod2 can be filled with Vp value of 20,000 of Holding:value as Holding is related to Company. Relative pronouns for some qmod expansions generate more complex questions, so the method introduces one-level nesting on an already filled qmod by expanding it using relative pronoun "whose." If qmod is not a Vp of any property p, the method replaces it with its corresponding class name and attaches a relative modifier clause using Vp of a property p of one of its related classes. In an abstracted template, when qmod1 is filled with Person:name='Neil Smit', the relative pronoun expansion of qmod1 is person whose value is 20,000 using related class Holding of Person. Entity qtmp is always retained as temporal values do not change the syntactic context of questions.

The method addresses the second challenge by constructing parse trees for template fillers as follows: For each class property, the method provides the parse tree. This incurs a small one-time effort proportional to the size of the domain schema, which is small compared to the knowledge base. For each instance of a class property, the method generates the parse tree by making the last word as root, and attaches the preceding words. For valued properties, the method constructs parse trees by attaching an actual value of the property as nmod to its parse tree using a preposition. For qmod, the method constructs relative pronoun expansion node by attaching to it the parse tree of Vp of a property p of a related class with tag acl:relcl and "whose."

In order to generate questions, the qmod, qsubj, and qtmp are recursively replaced with data from the schema 540 and the knowledge base 550 by processor 305, with each permutation provided as a question. The same function is applied to the CocaNGrams to generate further questions.

Training parsers on data generated by this method leads to high parsing accuracy (85% to 90% LAS, and 87% to 92% UAS), a significant increase over training with standard corpora: an increase of 5:3% to 9:1% LAS and an increase of 5:1% to 8:8% UAS over training on Universal Dependencies English Treebank and QuestionBank. The method is robust to a small seed set, improving parsing accuracy with as little as 10 seed questions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method, comprising:
   receiving, by a processor, a question;
   parsing, by the processor, the question into a parse tree, wherein the parse tree categorizes the question into parts of speech;
   generating, by the processor, an abstracted template for the question from the parse tree, wherein the generating the abstracted template for the question comprises:
      identifying, using the parts of speech, a subject entity ("qsubj") in the parse tree that represents a subject of the question;
      recursively identifying, using the parts of speech, a plurality of modifier entities ("qmod") attached to a head of either the subject entity (qsubj), or a modifier entity (qmod) that is already identified, wherein each modifier entity represents a noun that modifies the subject of the question;
      identifying, from the plurality of modifier entities, a temporal entity (qtmp) that captures temporal information in the question; and
      replacing the subject entity, the modifier entities, and the temporal entity with respective placeholders; and
   generating, by the processor, a plurality of new questions based on the abstracted template, a domain schema, and a domain knowledge base, wherein generating the new questions comprises:
      filling a placeholder for the subject entity with a word/phrase from the domain knowledge base that is identified either as a class property or a value of a class property, and that is not a name or a proper noun by the domain schema;
      filling placeholders for the modifier entities with nouns from the domain knowledge base that are related to the class property in the domain schema, wherein if the subject entity is filled using a class property, a modifier entity is filled using an instance of a class related to the class property, and if the subject entity is filled using the value of the class property, the modifier entity is filled using name of the class; and
      filling a placeholder for the temporal entity with a temporal value from the domain knowledge base.

2. The computer-implemented method of claim 1, wherein abstracting, by the processor, an abstracted template from the parse tree comprises substituting, by the processor, a first placeholder for the identifying qsubj entity.

3. A system comprising:
   a processor;
   a memory communicatively coupled to the processor, the memory having stored therein instructions that when executed cause the processor to:
      receive a question;
      parse the question into a parse tree, wherein the parse tree categorizes the question into parts of speech;

generate an abstracted template for the question from the parse tree, wherein the generating comprises:
    identifying, using the parts of speech, a subject entity ("qsubj") in the parse tree that represents a subject of the question;
    recursively identifying, using the parts of speech, a plurality of modifier entities ("qmod") attached to a head of either the subject entity (qsubj), or a modifier entity (qmod) that is already identified, wherein each modifier entity represents a noun that modifies the subject of the question;
    identifying, from the plurality of modifier entities, a temporal entity (qtmp) that captures temporal information in the question; and
    replacing the subject entity, the modifier entities, and the temporal entity with respective placeholders; and
generate a new question based on the abstracted template, a domain schema, and a domain knowledge base, wherein generating the new question comprises:
    filling a placeholder for the subject entity with a word/phrase from the domain knowledge base that is identified either as a class property or a value of a class property, and that is not a name or a proper noun by the domain schema;
    filling placeholders for the modifier entities with nouns from the domain knowledge base that are related to the class property in the domain schema, wherein if the subject entity is filled using a class property, a modifier entity is filled using an instance of a class related to the class property, and if the subject entity is filled using the value of the class property, the modifier entity is filled using name of the class; and
    filling a placeholder for the temporal entity with a temporal value from the domain knowledge base.

4. The system of claim 3 further comprising instructions that when executed cause the processor to substitute a first placeholder for the identifying qsubj entity.

5. A computer program product for generating questions, the computer program product comprising a computer readable storage medium having program instructions embodied therewith, the program instructions executable by a processor to cause the processor to:
    receive a question;
    parse the question into a parse tree, wherein the parse tree categorizes the question into parts of speech;
    generate an abstracted template for the question from the parse tree, wherein the generating comprises:
        identifying, using the parts of speech, a subject entity ("qsubj") in the parse tree that represents a subject of the question;
        recursively identifying, using the parts of speech, a plurality of modifier entities ("qmod") attached to a head of either the subject entity (qsubj), or a modifier entity (qmod) that is already identified, wherein each modifier entity represents a noun that modifies the subject of the question;
        identifying, from the plurality of modifier entities, a temporal entity (qtmp) that captures temporal information in the question; and
        replacing the subject entity, the modifier entities, and the temporal entity with respective placeholders; and
    generate a new question based on the abstracted template, a domain schema, and a domain knowledge base, wherein generating the new question comprises:
        filling a placeholder for the subject entity with a word/phrase from the domain knowledge base that is identified as a class property that is not a name or a proper noun by the domain schema;
        filling placeholders for the modifier entities with nouns from the domain knowledge base that are related to the class property in the domain schema and depending on the placeholder used for the subject entity; and
        filling a placeholder for the temporal entity with a temporal value from the domain knowledge base.

6. The computer program product of claim 5 further comprising program instructions that when executed cause the processor to substitute a first placeholder for the identifying qsubj entity.

7. A computer-implemented method for generating a training dataset for syntactic parsing of domain-specific questions, comprising:
    receiving, by a processor, seed-labeled questions from a domain, the questions being labeled with syntactic dependencies;
    receiving, by the processor, domain knowledge that includes: a domain schema modeling concepts and relationships of interest in the domain; a set of schema annotations provided by a domain expert; and a knowledge base of data instances for the domain schema;
    for each seed-labeled question, constructing, by the processor, a first question template that maintains a general structure of the question, but abstracts away details of specific entities in the question leaving gaps;
    generating, by the processor, a dataset of new questions by filling in the gaps in the first question template with new entities, the new entities being obtained by leveraging the domain schema, the set of schema annotations, and the knowledge base, wherein the new questions are labeled with syntactic dependencies, wherein generating the dataset of new questions comprises:
        filling a first gap in the first question template with a word/phrase from the domain knowledge, wherein the word/phrase is identified as a class property in the domain schema and wherein the word/phrase is not a name or a proper noun;
        filling a second gap in the first question template with a noun from the domain knowledge that is related to the class property in the domain schema, the noun specifying a name of a class corresponding to the class property; and
        filling a third gap in the first question template with a temporal value from the domain knowledge; and
    training, by the processor, a syntactic parser using the dataset of new questions.

8. The computer-implemented method of claim 7, comprising:
    receiving, by the processor, a dataset of generic questions;
    generating, by the processor, additional questions templates based on the dataset of generic questions that are similar to the first question template but have additional syntactic variation and gaps;
    generating, by the processor, a dataset of additional questions by filling in the gaps in the additional question templates with new entities obtained by leveraging the domain schema, the schema annotations, and the knowledge base, wherein the additional questions are labeled with syntactic dependencies; and training, by the processor, the syntactic parser using the dataset of new questions and the dataset of additional questions.

\* \* \* \* \*